(12) United States Patent  (10) Patent No.: US 8,369,104 B2
Kim et al.  (45) Date of Patent: Feb. 5, 2013

(54) CRADLING APPARATUS FOR PORTABLE COMMUNICATION DEVICE

(75) Inventors: Won-Tae Kim, Gyeonggi-do (KR);
Sang-Joon Park, Seoul (KR);
Jong-Woo Kim, Gyeonggi-do (KR);
Seok-Gyu Lee, Gyeonggi-do (KR)

(73) Assignee: Samsung Electronics Co., Ltd.,
Samsung-ro, Yeongtong-gu, Suwon-si,
Gyeonggi-do (KR)

( * ) Notice: Subject to any disclaimer, the term of this patent is extended or adjusted under 35 U.S.C. 154(b) by 253 days.

(21) Appl. No.: 12/845,049

(22) Filed: Jul. 28, 2010

(65) Prior Publication Data

US 2011/0032689 A1  Feb. 10, 2011

(30) Foreign Application Priority Data

Aug. 5, 2009 (KR) .......................... 10-2009-0071873

(51) Int. Cl.
*H05K 5/02* (2006.01)
*H04B 1/03* (2006.01)

(52) U.S. Cl. ..... 361/814; 361/755; 361/730; 455/575.3; 455/575.1

(58) Field of Classification Search .......... 361/728–730, 361/755, 825, 826; 455/575.1, 575.3, 575.4, 455/347, 566
See application file for complete search history.

(56) References Cited

U.S. PATENT DOCUMENTS

| 7,065,835 | B2 * | 6/2006 | Kuramochi | 16/357 |
| 7,872,861 | B2 * | 1/2011 | Ou et al. | 361/679.27 |
| 7,907,415 | B2 * | 3/2011 | Ueyama | 361/749 |
| 8,077,450 | B2 * | 12/2011 | Shen | 361/679.3 |
| 8,086,290 | B2 * | 12/2011 | Yoon et al. | 455/575.4 |

FOREIGN PATENT DOCUMENTS

KR  10-0678215  1/2007

* cited by examiner

*Primary Examiner* — Hung S Bui
(74) *Attorney, Agent, or Firm* — Cha & Reiter, LLC

(57) ABSTRACT

A cradling apparatus for a portable communication device which sets a cradling angle and provides a sense of click engagement to cradle a housing at a plurality of angles. The cradling apparatus includes a first housing, a second housing cradled at a slant angle while facing the first housing, and a cradling portion provided between the first housing and the second housing such that the cradling portion sets a cradling angle to cradle the second housing at a selected one of a plurality of cradling angles with respect to the first housing and further provides a sense of click engagement.

20 Claims, 10 Drawing Sheets

CRADLING APPARATUS FOR PORTABLE COMMUNICATION DEVICE

CLAIM OF PRIORITY

This application claims, pursuant to 35 U.S.C. §119(a), priority to, and the benefit of the earlier filing date of, that Korean Patent Application, entitled "Cradling Apparatus for Portable Communication Device," filed in the Korean Intellectual Property Office on Aug. 5, 2009 and assigned Serial No. 2009-71873, the entire disclosure of which is hereby incorporated by reference.

BACKGROUND OF THE INVENTION

1. Field of the Invention

The present invention relates to a cradling apparatus for a portable communication device, and more particularly to a cradling device for setting a cradle angle selected from a plurality of angles.

2. Description of the Related Art

Generally, portable communication devices refer to devices by which radio communication can be performed, while the devices are being carried. The portable communication devices include a hand-held phone (HHP), a cordless telephone (CT-)2 cellular phone, a digital phone, a personal communications systems (PCS) phone, and a personal digital assistant (PDA) and are sorted into different types according to their shapes. For example, the communication devices are classified into bar-type communication devices, flip-type communication devices, folder-type communication devices, slide-type communication devices, and swing-type communication devices. The bar-type terminal has a single housing shaped like a bar. The above-mentioned portable communication devices are generally provided with an antenna unit, data input/output units, and data transmitting/receiving units. The data input unit usually includes a keypad with which data is input by means of depressing buttons.

However, the conventional portable communication devices have some drawbacks. That is, a separate cradling apparatus is used for retaining the device to provide the user with a convenient means of viewing of information displayed on a display device. However, the addition of a separate cradling apparatus may be uneconomical for a user. As is well known, when the information displayed on the display device faces the user at a slant, the user can conveniently view the displayed information. Conventionally, the user, without the separate cradling apparatus, may view a screen displayed on the display device by slanting the communication device gripped with the hand. However, the user inevitably experiences discomfort in viewing the screen displayed on the display device because of the absence of the separate cradling apparatus on the desk or the like.

To solve the foregoing problems, Korean Patent Registration No. 678215 (U.S. Pat. No. 7,448,872) discloses in detail a portable terminal and a sliding cradling apparatus thereof.

As shown in FIGS. 1 and 2, a sliding cradling apparatus 10 for a portable terminal includes a first housing 20 having a plurality of keys 21, a second housing 30 which has a display device 31, slides on the first housing 20, and is cradled with a slant on the first housing 20 after sliding, a first member 50 provided in the first housing 20, a second member 60 engaged with the second housing 30, a sliding guide portion 70 provided between the first member 50 and the second ember 60 to guide the sliding of the second housing 30, and a hinge means 80 provided in the first member 50 and the sliding guide portion 70 to rotate the second member 60 and the sliding guide portion 70 around a hinge axis A1 in a direction away from the first member 50 while facing the first member 50.

However, since the conventional sliding cradling apparatus described in the aforementioned patent application cradles the second housing at a slant angle after sliding the second housing away from the first housing to expose the keys of the first housing, the cradling angle of the second housing cannot be set at different angles.

To cradle the second housing at different angles and provide a sense of a click engagement, additional parts and installation spaces thereof are required. These addition parts increase the size of a product, and also, the manufacturing cost of the product and the number of assembly processes.

Accordingly, there is a need for a cradling apparatus, providing cradling at various angles and a sense of click response or engagement, while downsizing the conventional cradling apparatus through simplification of the structure thereof and reducing manufacturing cost and the number of assembly processes.

SUMMARY OF THE INVENTION

An aspect of the present invention is to address at least the above problems and/or disadvantages. Accordingly, an aspect of the present invention is to provide a cradling apparatus for a portable communication device, which includes a cradling portion for setting a cradling angle to cradle a housing at a plurality of angles and providing a sense of click engagement while, downsizing a product containing such a cradling portion by simplifying the structure of the cradling apparatus, and reducing manufacturing cost and the number of assembly processes.

According to an aspect of the present invention, there is provided a cradling apparatus for a portable communication device, the cradling apparatus including a first housing, a second housing cradled at a slant angle while facing the first housing, and a cradling portion provided between the first housing and the second housing such that the cradling portion sets a cradling angle to cradle the second housing selected from a plurality of angles and further provides a sense of click engagement.

BRIEF DESCRIPTION OF THE DRAWINGS

The above and other features and advantages of an exemplary embodiment of the present invention will be more apparent from the following detailed description taken in conjunction with the accompanying drawings, in which.

DETAILED DESCRIPTION OF THE INVENTION

Figure 1:
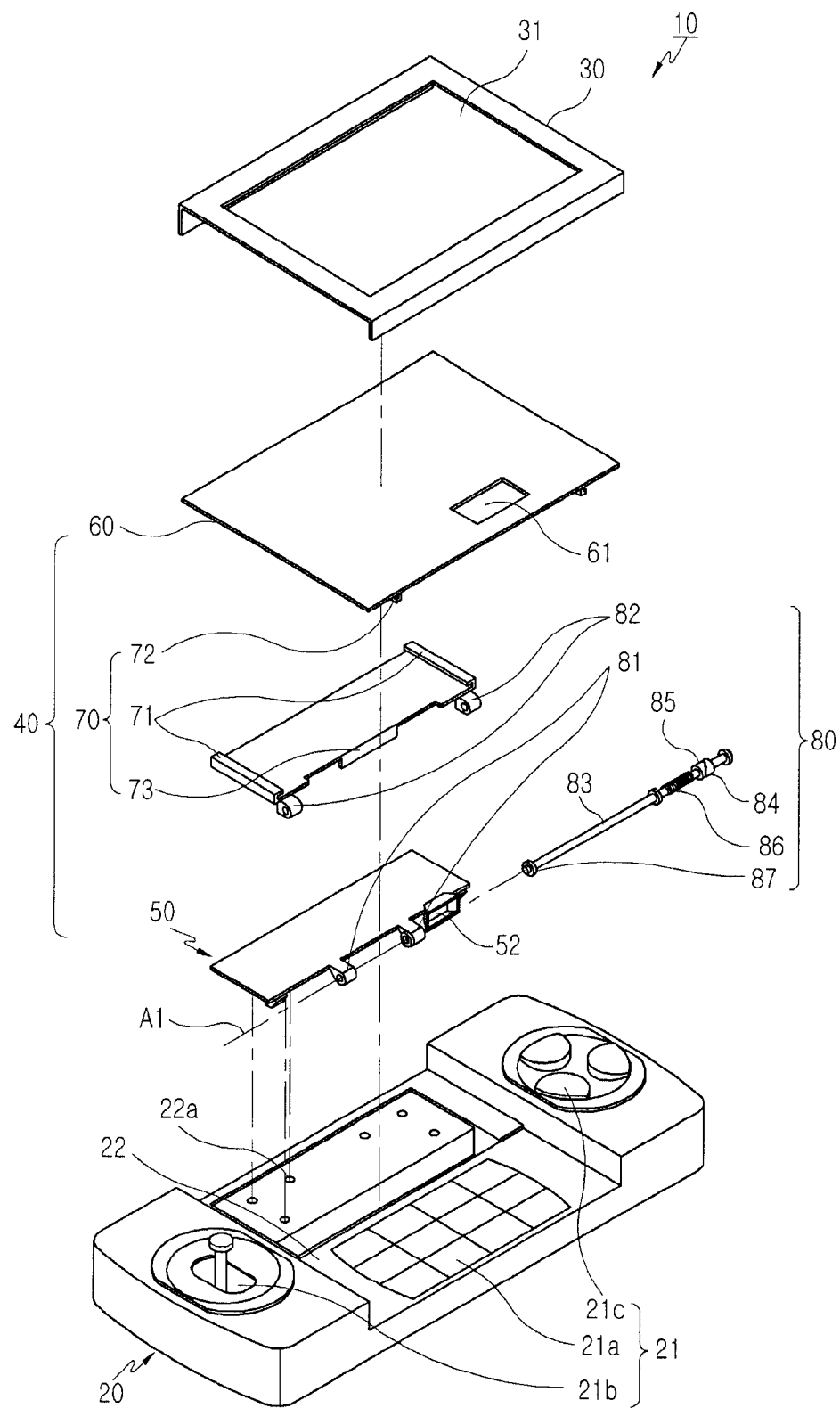
FIG. 1 is an exploded perspective view of a conventional slide cradling apparatus for a portable communication device.
Figure 2:
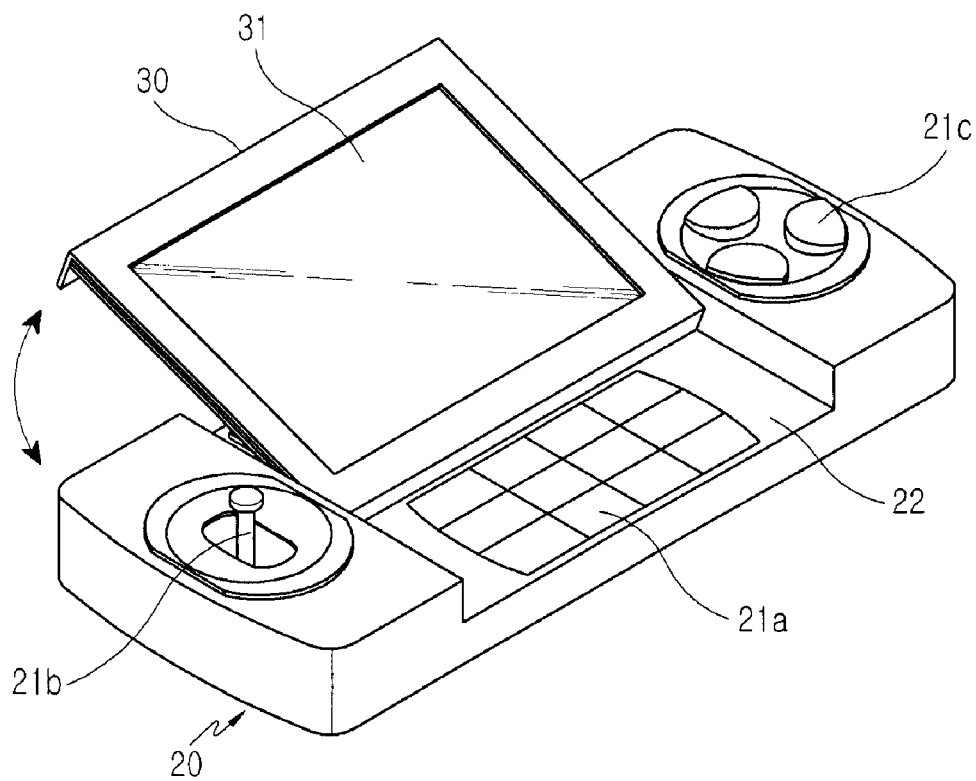
FIG. 2 is a perspective view of an operating state of the conventional slide cradling apparatus.

Exemplary embodiments of the present invention will be described in detail with reference to the accompanying drawings. It should be understood that the embodiment(s) described herein and structures shown in the drawings are merely illustrative and various modifications which can substitute for the embodiment and structures can be made at the time of filing the present application.

As shown in FIGS. 3 through 10, a cradling apparatus 100 for a portable communication device includes a first housing 110, a second housing 120, and a cradling portion 130. The first housing 100 includes a keypad 111 and is adapted to be exposed when the second housing 120 in an open position and covered when the second housing is in a closed position. The second housing 120 includes a display device 121 (see FIG. 7) and is provided on a top surface of the first housing 110 to be cradled at a slant angle with respect to the first housing 110 while facing the first housing 110. The cradling portion 130 is provided between the first housing 110 and the second housing 120 to set a cradling angle of the second housing 120 with respect to the first housing 110 selected from a plurality of cradle angles. In addition, the cradling portion provides a sense of click engagement as the second housing 120 is positioned (opened or closed) with respect to the first housing 110.

Figure 3:
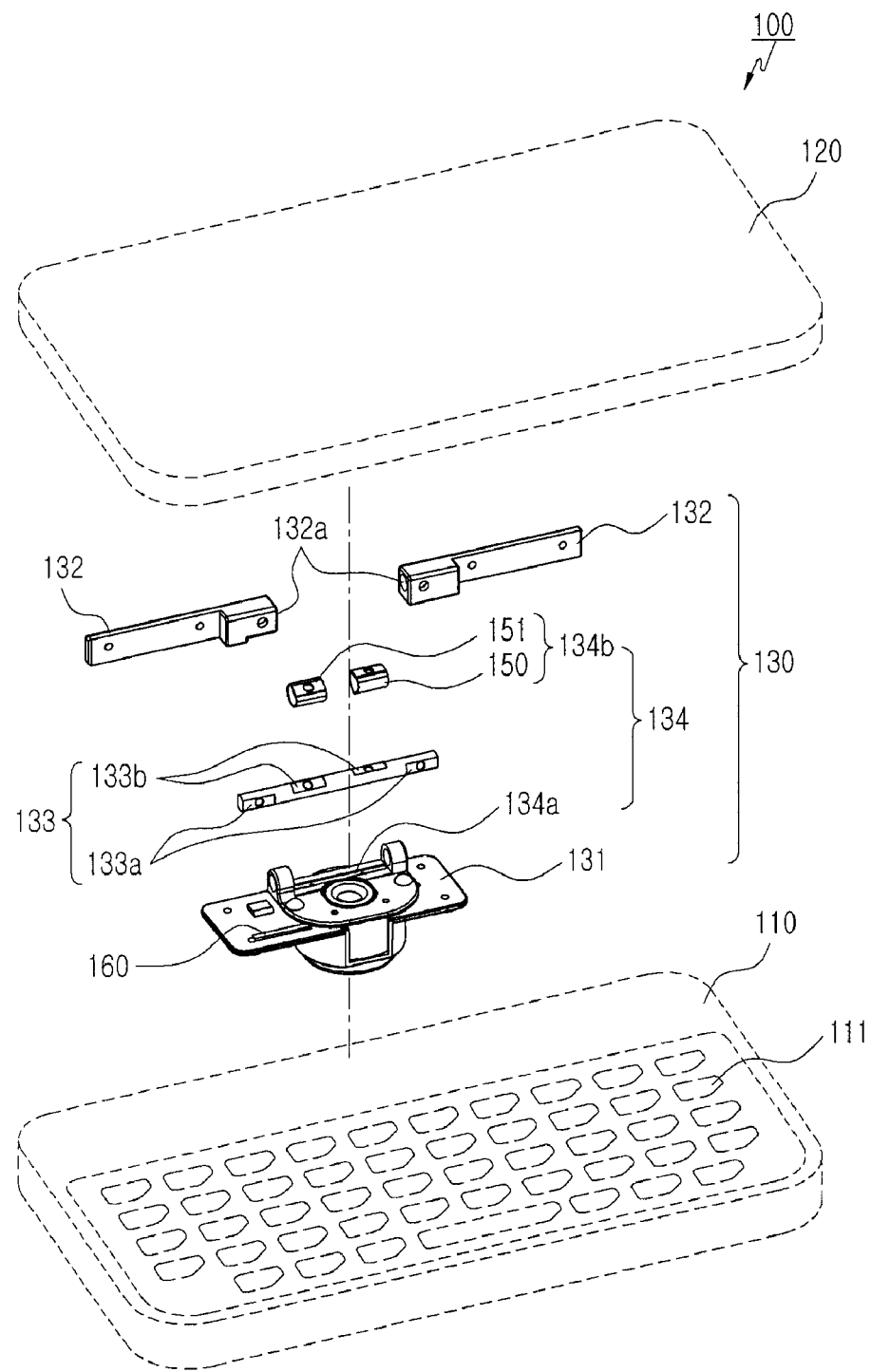
FIG. 3 is an exploded perspective view of a cradling apparatus for a portable communication device according to an embodiment of the present invention.
Figure 4:
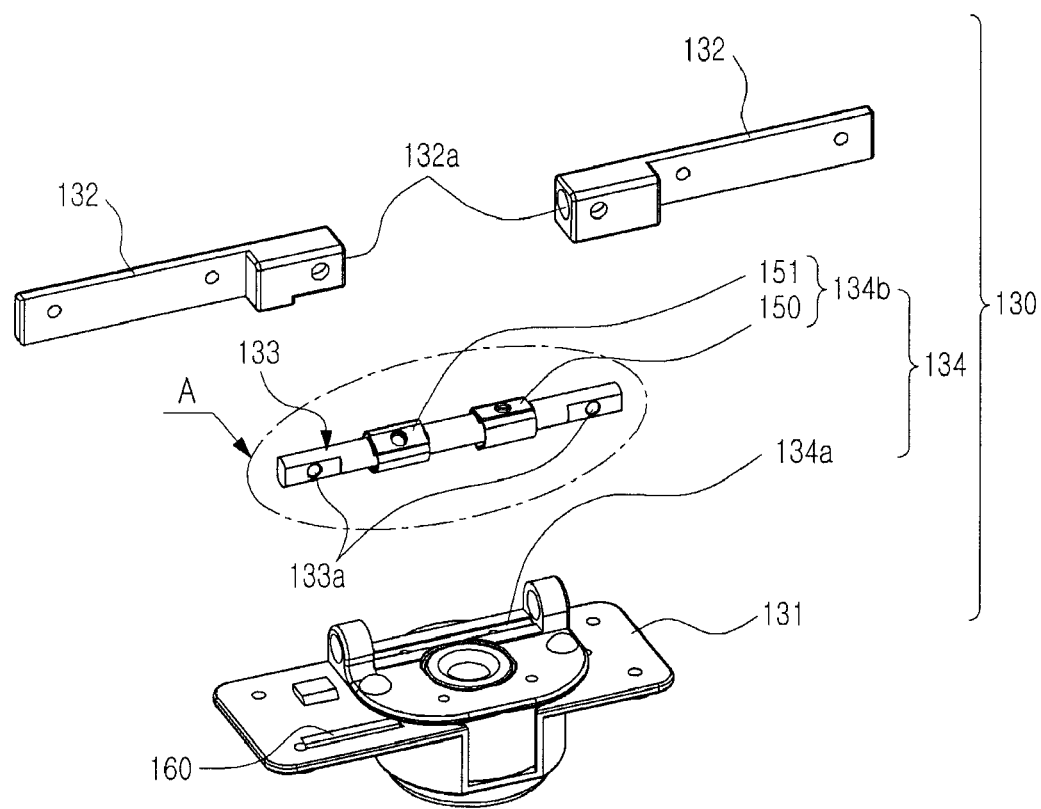
FIG. 4 is an enlarged exploded perspective view of a cradling apparatus for a portable communication device according to an embodiment of the present invention.
Figure 5:
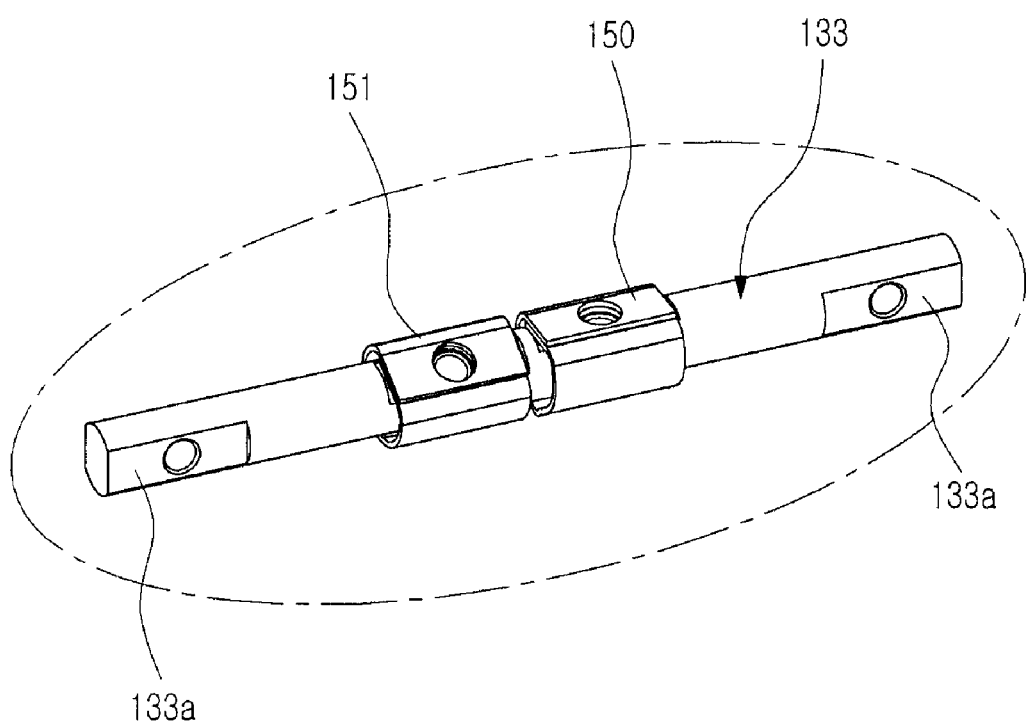
FIG. 5 is an enlarged perspective view of a portion A shown in FIG. 4.

As shown in FIGS. 3 through 5, the cradling portion 130 includes a hinge assembly 131, a pair of cradling engagement portions 132, a cradling shaft 133, and at least one or more stopper portions 134. The hinge assembly 131 is engaged with the first housing 110 to swing the second housing 120 into a position with respect to the first housing. The cradling engagement portions are engaged with the second housing 120 to cradle the second housing 120 at corresponding ones of a plurality of cradle angles. The cradling shaft 133 is engaged between the cradling engagement portions 132 to be cradled together with the cradling engagement portions 132 when the second housing 120 is cradled. The stopper portions 134 are engaged with the cradling shaft 133 to form a plurality of cradling angles such that the cradling engagement portions 132 and the cradling shaft 133 are cradled together with the cradling of the second housing 120. Thus, a cradling angle of the second housing 120 with respect to the first housing 110 may be set and a sense of click engagement is provided by an elastic force.

As shown in FIGS. 3 and 5, at both ends of the cradling shaft 133 are formed coupling protrusions 133a for insertion into coupling grooves 132a formed in the cradling engagement portions 132. At positions inward from the both ends of the cradling shaft 133, or inner positions of the cradling shaft 133, are formed a plurality of engagement grooves 133b for engagement with the stopper portions 134 to form a plurality of cradling angles. The cradling shaft 133 is in a cylindrical shape to facilitate the engagement of the stopper portions 134 therewith.

As shown in FIGS. 3 through 5, the stopper portions 134 include a stopper groove 134a and at least one or more stopper members 134b. The stopper groove 134a is formed in the hinge assembly 131 to be inserted into or removed from the stopper members 134b. The stopper members 134b are engaged with the cradling shaft 133 to be inserted into or removed from the stopper groove 134a such that at the time of cradling of the second housing with respect to the first housing with the cradling shaft 133, the stopper members 134b set a cradling angle and provide a sense of click engagement by an elastic force.

As shown in FIGS. 3 through 10, the stopper members 134b include a first stopper member 150 and a second stopper member 151. The first stopper member 150 is engaged with the cradling shaft 133 such that it is removed from the stopper groove 134a when the second housing 120 is cradled after being swung open, and it is inserted into the stopper groove 134a before the second housing 120 is cradled. The second stopper member 151 is engaged with the cradling shaft 133 such that when the second housing 120 is cradled after being swung open, the second stopper member 151 is removed from the stopper groove 134a and then inserted into the stopper groove 134a to set a cradling angle and maintain the cradled state of the second housing 120.

In addition to the first stopper member 150 and the second stopper member 151, another stopper member (not shown) may be engaged with the cradling shaft 133 to form a cradling angle when the second housing 120 is cradled at the cradling angle.

Figure 8:
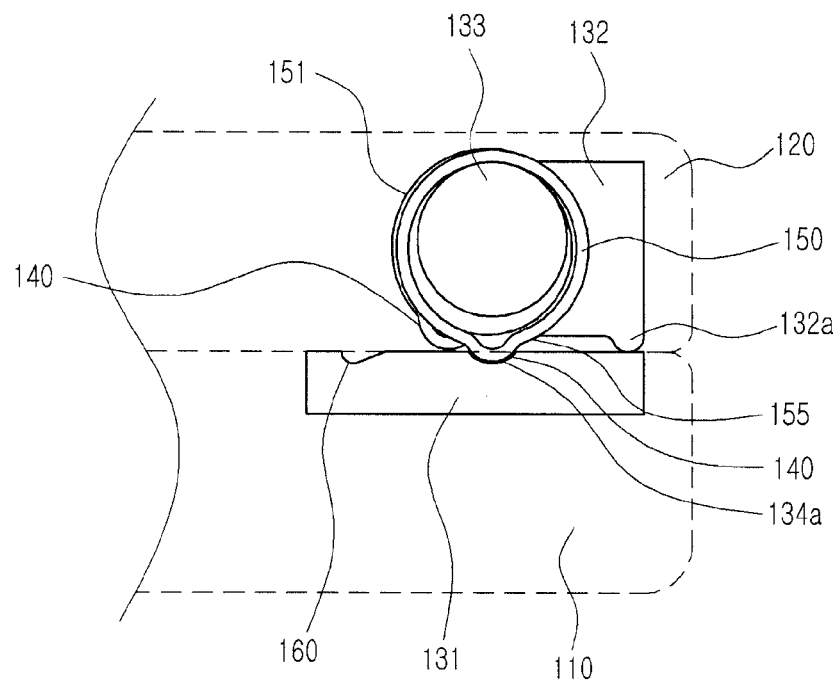
FIG. 8 is a side cross-sectional view showing a pre-operation state of a cradling apparatus for a portable communication device according to an embodiment of the present invention.
Figure 9:
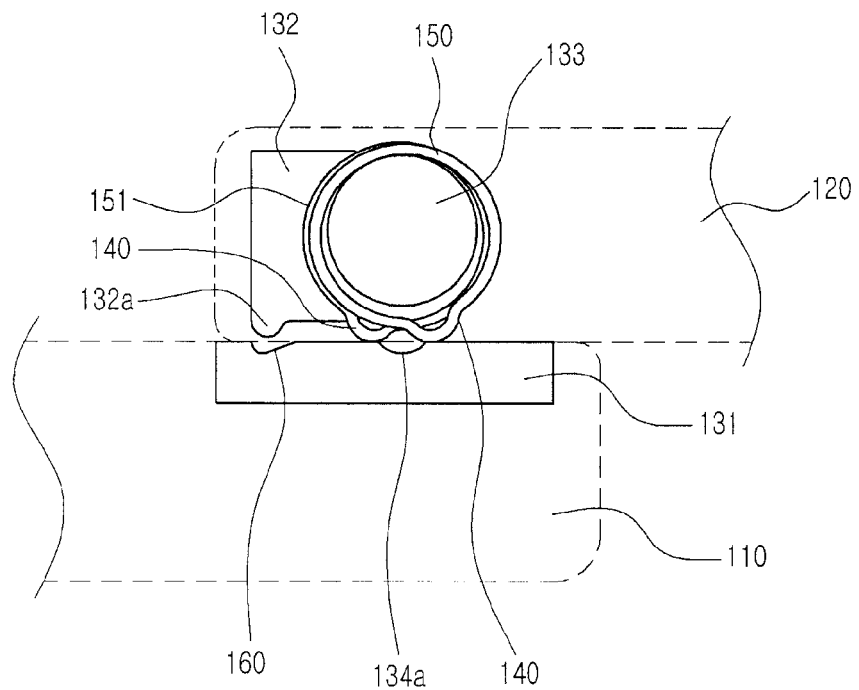
FIG. 9 is a side cross-sectional view showing an operating process of a cradling apparatus for a portable communication device according to an embodiment of the present invention.
Figure 10:
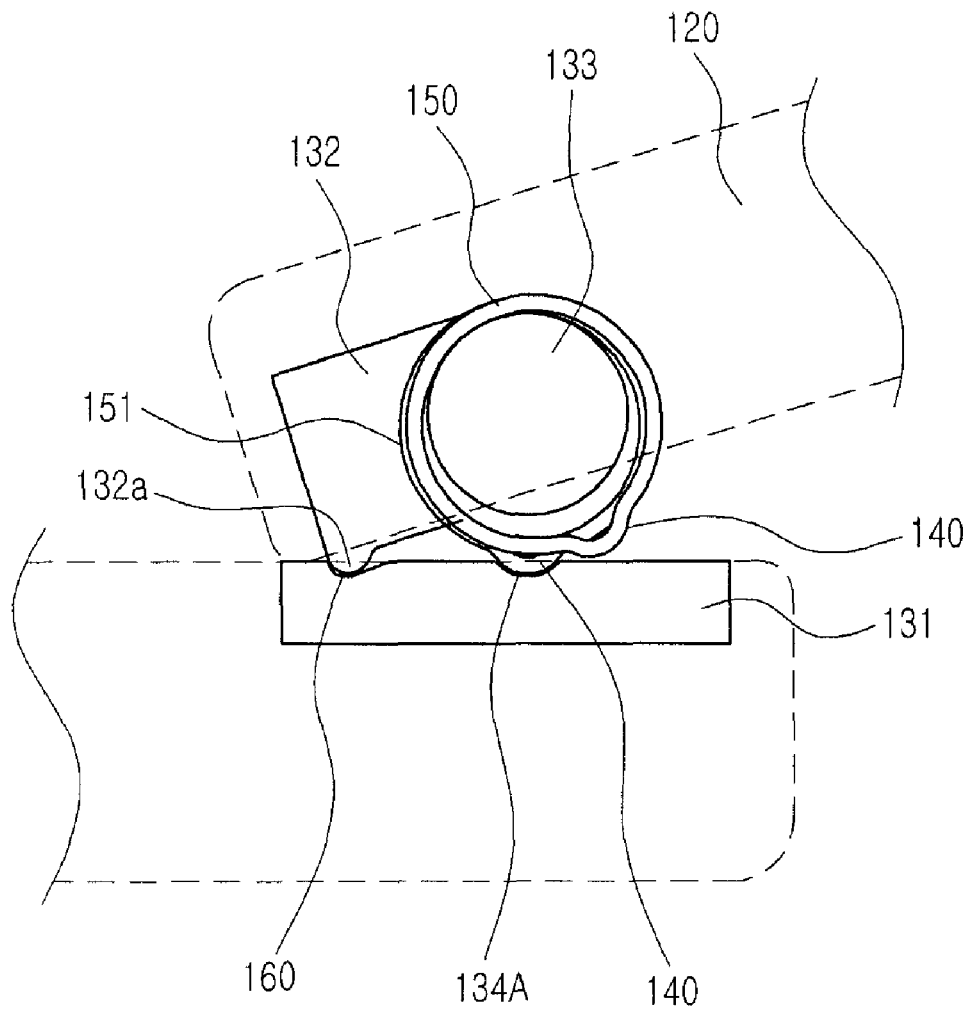
FIG. 10 is a side cross-sectional view showing a post-operation state of a cradling apparatus for a portable communication device according to an embodiment of the present invention.

As shown in FIGS. 8 through 10, the stopper groove 134a is in a hemispheric shape to facilitate removal or insertion of the first stopper member 150 and the second stopper member 151. The first stopper member 150 and the second stopper member 151 may include ring springs 155 to provide an elastic force when being removed from or inserted into the stopper groove 134a.

As shown in FIGS. 8 through 10, along outer circumferences of the ring springs 155 are formed at least one or more protrusions 140 to be inserted into or removed from the stopper groove 134a. The protrusions 140 are in a hemispheric shape to be inserted into or removed from the hemispheric stopper groove 134a.

As shown in FIGS. 8 through 10, in the hinge assembly 131 is formed a guide groove 160 for guiding a cradling angle of the second housing 120 by guiding the cradling engagement portions 132 when the second housing 120 is cradled after being swung open or closed.

Figure 11:
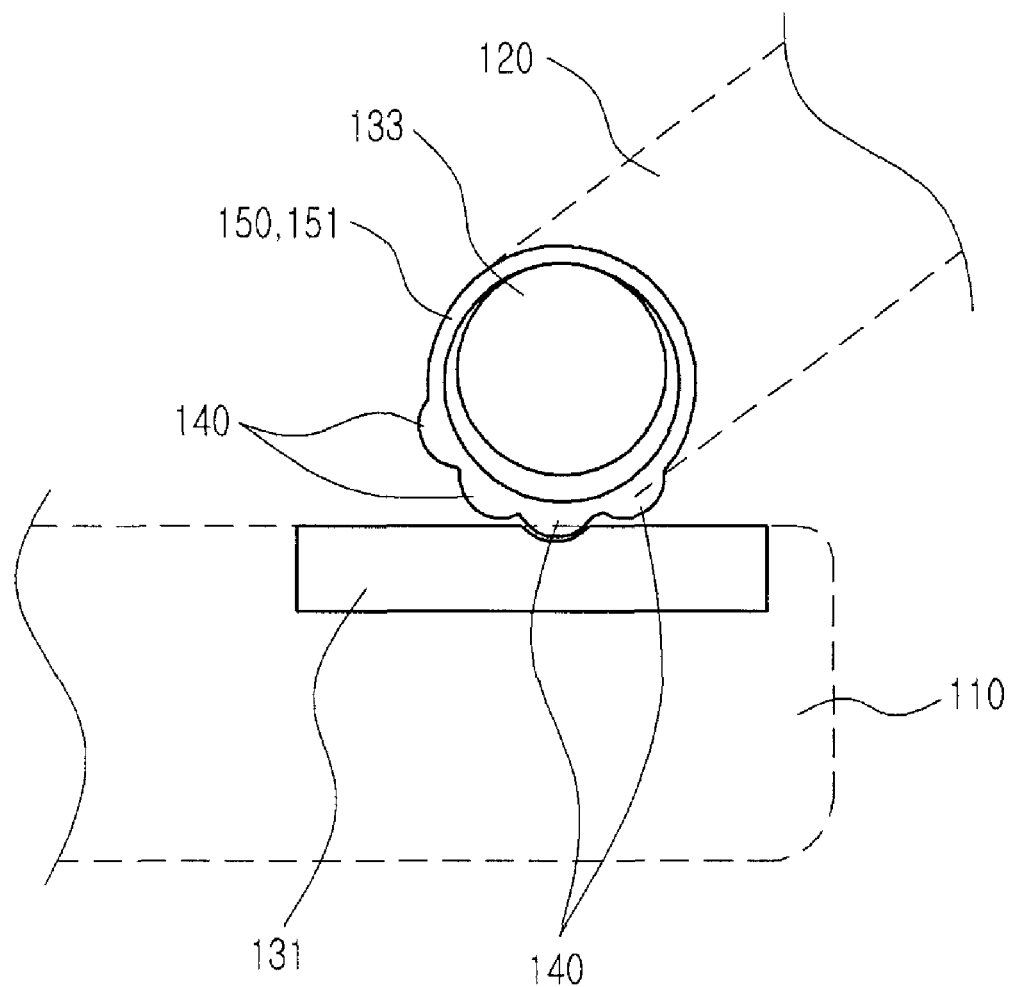
FIG. 11 is a side cross-sectional view showing another example of stopper members in a cradling apparatus for a portable communication device according to an embodiment of the present invention.

Shown in FIG. 11 is another example of the first stopper member 150 and the second stopper member 151. At least one or more protrusions 140 are formed along the outer circumferences of the first stopper member 150 and the second stopper member 151 to allow the second housing 120 to be cradled at a plurality of cradle angles. When the second housing 120 is cradled, the protrusions 140 are removed from or inserted into the stopper groove 134a (see FIG. 9) and allow the second housing 120 to be cradled at a selected one of a plurality of cradle angles with a sense of click engagement.

The cradling portion 130 limits a cradling angle and provides a sense of click engagement before and after the second housing 120 is moved with respect to the first housing 110.

With reference to FIGS. 3 through 11, a detailed description is made of an operating process of the cradling apparatus for the portable communication device according to an embodiment of the present invention.

As shown in FIGS. 3 through 10, the cradling apparatus 100 includes a first housing 110, a second housing 120, and a cradling portion 130 that includes a hinge assembly 131, a pair of cradling engagement portions 132, a cradling shaft 133, and at least one or more stopper portions 134.

Although a swing-type terminal has been used above as an example of the portable communication device according to an embodiment of the present invention, the portable communication device may also be a device of other types without being limited to the swing-type terminal. For example, portable communication devices can be generally classified into flip-type communication devices, folder-type communication devices, bar-type communication devices, and slide-type communication devices, and the present invention is applicable to any one of the aforementioned types of communication devices.

In addition, the present invention can also be applied to any information communication devices and multimedia devices such as a Portable Multimedia Player (PMP), an MP3 player, a digital broadcasting player, a Personal Digital Assistant (PDA), a smart phone, and so forth.

As shown in FIGS. 3 through 10, the stopper portions 134 are engaged with the plurality of engagement grooves 133b (FIG. 3) formed at the inner positions of the cradling shaft 133. The plurality of engagement grooves 133b are engaged with the stopper portions 134 to form a plurality of cradling angles.

As such, the stopper portions 134 are insert-coupled with the cradling shaft 133 and are also engaged with the engagement grooves 133b. In this state, the engagement protrusions 133a (FIG. 3) of the cradling shaft 133 are coupled with the engagement grooves 132a formed in the cradling engagement portions 132, and the stopper portions 134 engaged with the cradling shaft 133 come into contact with the stopper groove 134a.

The stopper portions 134 include the stopper groove 134a and the at least one or more stopper members 134b. The at least one or more stopper members 134b include the first stopper member 150 and the second stopper member 151 which include ring springs 155.

The ring springs 155 contact the stopper groove 134a. At this time, the protrusions 140 formed along the outer circumferences of the ring springs contact the stopper groove 134a.

The hinge assembly 131 is engaged with the first housing 110. The cradling engagement portions 132 are engaged with the second housing 120.

In this state, as shown in FIGS. 7 through 10, to cradle the second housing 120, the second housing 120 is swung out, or open, from the first housing 110 and then cradled at an angle slanted with respect to the first housing 110.

At that time, the cradling engagement portions 132 and the cradling shaft 133 are also cradled. In addition, the stopper portions 134 and thus the stopper members 134b are also cradled.

Since the stopper members 134b include the first stopper member 150 and the second stopper member 151 as shown in FIGS. 8 through 10, the first stopper member 150 is removed from the stopper groove 134a while providing an elastic force.

In this situation, the second stopper member 151 is inserted into the stopper groove 134a while providing an elastic force that maintains the cradled state of the second housing 120.

As shown in FIGS. 8 through 10, the guide groove 160, which has been formed in the hinge assembly 131, guides guide protrusions 132a formed on the cradling engagement portions 132 to guide the cradling angle of the second housing 120.

As shown in FIGS. 8 through 10, the first stopper member 150 and the second stopper member 151 include ring springs 155. Along the outer circumferences of the ring springs 155 are formed protrusions 140 that are inserted into or removed from the stopper groove 134a such that the ring springs 155 are deformed to provide an elastic force when the protrusions 140 are removed from or inserted into the stopper groove 134a.

In addition to the first stopper member 150 and the second stopper member 151, another stopper member (not shown) may also be engaged with the cradling shaft 133 to allow cradling at another angle.

When another stopper member (not shown) in addition to the first stopper member 150 and the second stopper member 151 is engaged with the cradling shaft 133, the second housing 120 can be cradled at the cradling angle of the additional stopper member (not shown).

Figure 6:
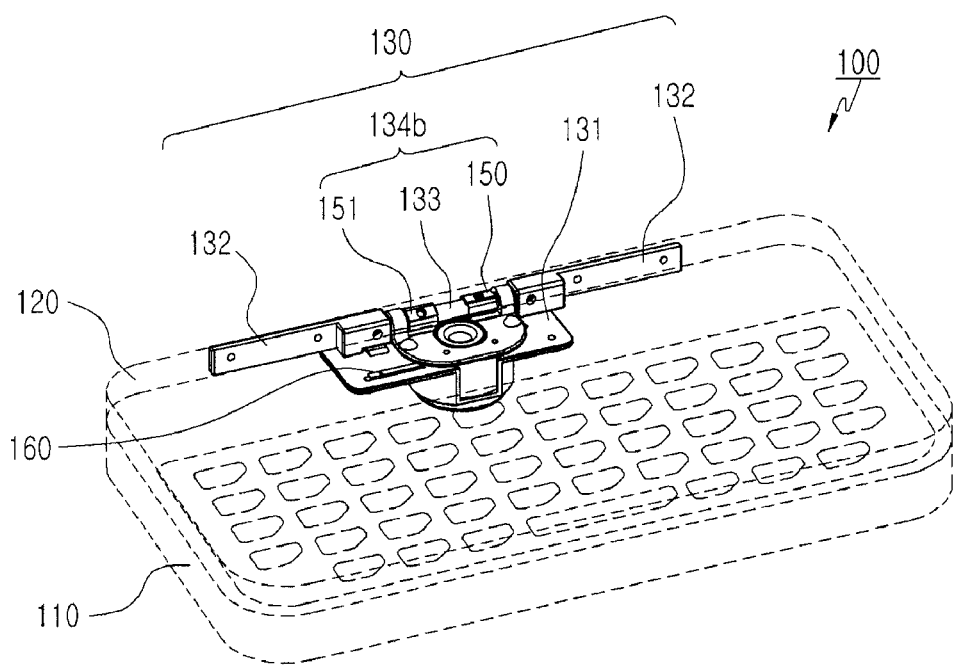
FIG. 6 is a perspective view showing a before-operation (pre-operation) state of a cradling apparatus for a portable communication device according to an embodiment of the present invention.
Figure 7:
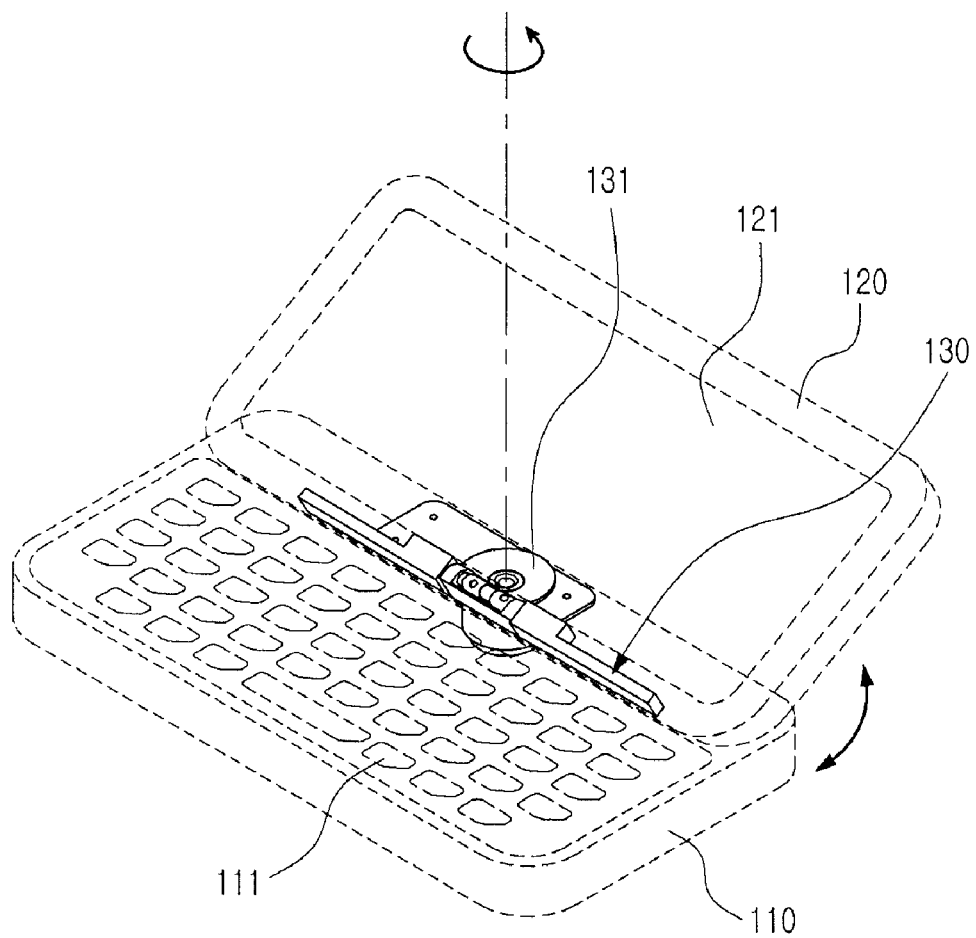
FIG. 7 is a perspective view showing an after-operation (post-operation) state of a cradling apparatus for a portable communication device according to an embodiment of the present invention.

In this state, as shown in FIG. 6, to return the second housing 120 to the original position where the second housing 120 faces the first housing 110, the second housing 120 is pushed to urge the second housing 120 to face a top surface of the first housing 110, whereby the cradling engagement portion 132 and the cradling shaft 133 also become pressed and the stopper portions 134 also become pressed.

At this time, as shown in FIG. 6, the second stopper member 151 is removed from the stopper groove 134a while providing an elastic force and the first stopper member 150 is inserted into the stopper groove 134a. In this situation, the second housing 120 is swung and is urged to face the top surface of the first housing 110, thereby returning the second housing 120 to the original position.

In this state, the second housing 120, which is not yet swung from the first housing 110, may be cradled at each of a plurality of angles.

As such, the cradling portion 130 can cradle the second housing 120 at a selected one of a plurality of cradle angles and further provide a sense of click engagement before and after the second housing 120 is moved (opened or closed) with respect to the first housing 110.

In another example of the first stopper member 150 and the second stopper member 151 shown in FIG. 11, the at least one or more protrusions 140 are formed along the outer circumferences of the first stopper member 150 and the second stopper member 151 to allow the second housing 120 to be cradled at a selected one of a plurality of angles.

Therefore, at the time of cradling of the second housing 120, the protrusions 140 are removed from or inserted into the stopper groove 134a and provide cradling at each of the plurality of angles and further provides a sense of click engagement at the selected angle.

It would be obvious to those of ordinary skill in the art that the above-described cradling apparatus for a portable communication device according to the present invention is not limited to the foregoing embodiments and drawings, and various substitutions, modifications, and changes may be made therein without departing from the spirit and scope of the invention.

What is claimed is:

1. A cradling apparatus for a portable communication device, comprising:
   a first housing;
   a second housing cradled at a slant while facing the first housing; and
   a cradling portion provided between the first housing and the second housing such that the cradling portion sets a cradling angle to cradle the second housing in an open position at a selected one of at least two different cradling angles with respect to the first housing, the cradling portion formed to provide a sense of click engagement of the second housing at each one of at least two different angles.

2. The cradling apparatus of claim 1, wherein the cradling portion comprises:
   a hinge assembly engaged with the first housing to swing the second housing;
   a pair of cradling engagement portions engaged with the second housing;
   a cradling shaft engaged between the pair of cradling engagement portions; and
   at least one or more stopper portions engaged with the cradling shaft to form the at least two different cradling angles such that at the time of cradling of the second housing, the cradling engagement portions and the cradling shaft are also cradled and the at least one or more stopper portions set the cradling angle and provide the sense of click engagement.

3. The cradling apparatus of claim 2, wherein at both ends of the cradling shaft are formed coupling protrusions for insertion into coupling grooves formed in the cradling engagement portions, and at positions inward from each end of the cradling shaft are formed a plurality of engagement grooves for engagement with the stopper portions to form the at least two different cradling angles.

4. The cradling apparatus of claim 2, wherein the cradling shaft is in a cylindrical shape.

5. The cradling apparatus of claim 2, wherein the stopper portions comprise:
   a stopper groove formed in the hinge assembly; and
   at least one or more stopper members engaged with the cradling shaft and removed from or inserted into the stopper groove to set the cradling angle and provide the sense of click engagement by the elastic force when being cradled together with the cradling shaft.

6. The cradling apparatus of claim 5, wherein the stopper groove is in a hemispheric shape.

7. The cradling apparatus of claim 5, wherein the stopper members comprise a first stopper member and a second stopper member,
   the first stopper member removed from the stopper groove at the time of cradling of the second housing and inserted into the stopper groove prior to the cradling of the second housing, and
   the second stopper member being removed from the stopper groove and then inserted into the stopper groove at the time of the cradling of the second housing to set the cradling angle and maintain a cradled state of the second housing.

8. The cradling apparatus of claim 5, wherein the stopper members comprise ring springs, along an outer circumference of which are formed at least one or more protrusions removable from or insertable into the stopper groove.

9. The cradling apparatus of claim 7, wherein the protrusions are in a hemispheric shape.

10. The cradling apparatus of claim 2, wherein in the hinge assembly is formed a guide groove for guiding the cradling angle of the second housing at the time of cradling of the second housing.

11. The cradling apparatus of claim 1, wherein the cradling portion sets the cradling angle and provides the sense of click engagement before and after movement of the second housing.

12. A cradling apparatus for a portable communication device, the cradling apparatus comprising:
   a first housing;
   a second housing including at least one protrusion extending therefrom; and
   a cradling portion provided between the first housing and the second housing such that the cradling portion sets a cradling angle to cradle the second housing at a selected one of a plurality of cradling angles with respect to the first housing, the cradling portion formed to provide a sense of click engagement of the second housing protrusion at each of the plurality of angles, wherein the cradling portion comprising:
a shaft including a plurality of stopper grooves, the stopper grooves corresponding to the plurality of cradling angles.

13. A cradling apparatus for a portable communication device, comprising:
   a first housing;
   a second housing cradled at a slant while facing the first housing;
   a cradling portion provided between the first housing and the second housing such that the cradling portion sets a cradling angle to cradle the second housing at a selected one of a plurality of cradling angles with respect to the first housing, the cradling portion formed to provide a sense of click engagement of the second housing at each of the plurality of angles;
   a hinge assembly engaged with the first housing to swing the second housing;
   a pair of cradling engagement portions engaged with the second housing;
   a cradling shaft engaged between the pair of cradling engagement portions; and
   at least one or more stopper portions engaged with the cradling shaft to form the plurality of cradling angles such that at the time of cradling of the second housing, the cradling engagement portions and the cradling shaft are also cradled and the at least one or more stopper portions set the cradling angle and provide the sense of click engagement.

14. The cradling apparatus of claim 13, wherein at both ends of the cradling shaft are formed coupling protrusions for insertion into coupling grooves formed in the cradling engagement portions, and at positions inward from each end of the cradling shaft are formed a plurality of engagement grooves for engagement with the stopper portions to form the plurality of cradling angles.

15. The cradling apparatus of claim 13, wherein the cradling shaft is in a cylindrical shape.

16. The cradling apparatus of claim 13, wherein the stopper portions comprise:
   a stopper groove formed in the hinge assembly; and
   at least one or more stopper members engaged with the cradling shaft and removed from or inserted into the stopper groove to set the cradling angle and provide the sense of click engagement by the elastic force when being cradled together with the cradling shaft.

17. The cradling apparatus of claim 16, wherein the stopper members comprise a first stopper member and a second stopper member,
- the first stopper member removed from the stopper groove at the time of cradling of the second housing and inserted into the stopper groove prior to the cradling of the second housing, and
- the second stopper member being removed from the stopper groove and then inserted into the stopper groove at the time of the cradling of the second housing to set the cradling angle and maintain a cradled state of the second housing.

18. The cradling apparatus of claim 16, wherein the stopper members comprise ring springs, along an outer circumference of which are formed at least one or more protrusions removable from or insertable into the stopper groove.

19. The cradling apparatus of claim 13, wherein in the hinge assembly is formed a guide groove for guiding the cradling angle of the second housing at the time of cradling of the second housing.

20. The cradling apparatus of claim 13, wherein the cradling portion sets the cradling angle and provides the sense of click engagement before and after movement of the second housing.

* * * * *